United States Patent [19]

Fass et al.

[11] Patent Number: 4,642,899
[45] Date of Patent: Feb. 17, 1987

[54] MEASURING ATTACHMENT

[76] Inventors: Leon Fass, 47 Knob Hill Rd., Hackettstown, N.J. 07840; Vladimir Loyevsky, 29 Jacoby St., Maplewood, N.J. 07040

[21] Appl. No.: 757,141

[22] Filed: Jul. 22, 1985

[51] Int. Cl.⁴ .............................................. G01B 3/12
[52] U.S. Cl. ...................................... 33/140; 33/129; 33/133
[58] Field of Search ................. 33/139, 129, 140, 138, 33/133, 134 R, 141 R, 141 E, 141 B, 142, 125 M, 125 C, 125 R, 143 L

[56] References Cited

U.S. PATENT DOCUMENTS

| | | | |
|---|---|---|---|
| 1,417,021 | 5/1922 | Bevel | 33/134 R |
| 3,015,165 | 1/1962 | Steele | 33/134 R |
| 3,284,906 | 11/1966 | Holleman | 33/134 R |
| 4,181,959 | 1/1980 | Tateishi | 33/138 X |
| 4,186,490 | 2/1980 | Quenot | 33/139 |
| 4,316,081 | 2/1982 | Washizuka | 33/139 X |

*Primary Examiner*—Harry N. Haroian
*Attorney, Agent, or Firm*—Ilya Zborovsky

[57] ABSTRACT

A measuring attachment has a rotary member rotatable under the action of frictional contact with a movable tape and the like, a transforming element which transform the rotation of the rotary member into signals, a computer for converting the signals into distance measurements data, a display for displaying the data, and a housing with receiving means for receiving the tape, with adjusting means for bringing the rotary member in the frictional contact with the tape.

11 Claims, 7 Drawing Figures

MEASURING ATTACHMENT

BACKGROUND OF THE INVENTION

The present invention relates to a measuring attachement, and particularly to an attachment to measuring elements such as measuring tapelines, rulers etc.

Existing tapelines, rulers etc. have certain disadvantages, for example in that it is difficult to read the data thereon because of small marks and figures and their frequent dirtying, many tapelines have marks and figures only in the British system and computations are required for determining the respective data in the metric system, the accuracy of measurements is not very high as a rule. Moreover, there are no attachements which can be used with any conventional tape, cord, ruler and the like elements.

SUMMARY OF THE INVENTION

Accordingly, it is an object of the present invention to provide a measuring attachement which avoids the disadvantages of the prior art.

More particularly, it is an object of the present invention to provide a measuring attachement which can cooperate with wide variety of tapes, cords, rulers etc, and at the same time provides high accuracy of measurements, easy reading of measurement data, and obtaining the data in at least two systems of measurements.

In keeping with these objects and with others which will become apparent hereinafter, one feature of the present invention resides, briefly stated, in a measuring attachement which has a housing, receiving means in said housing for receiving a tape, a cord and the like, rotary means rotatable under the action of movement of the latter mentioned elements when the rotary means is in contact with the same, means for adjusting the position of the rotary means to bring the same in contact with the above mentioned elements, means for transforming the rotary movement of the rotary means into signals, means for computing these signals, and means for displaying the results of the computation.

When the attachement is designed in accordance with the present invention, it attains the above mentioned objects.

The novel features of the present invention are set forth in particular in the appended claims. The invention itself, however, will be best understood from the following description of preferred embodiments, which is accompanied by the following drawings.

DESCRIPTION OF A PREFERRED EMBODIMENT

Figure 1:
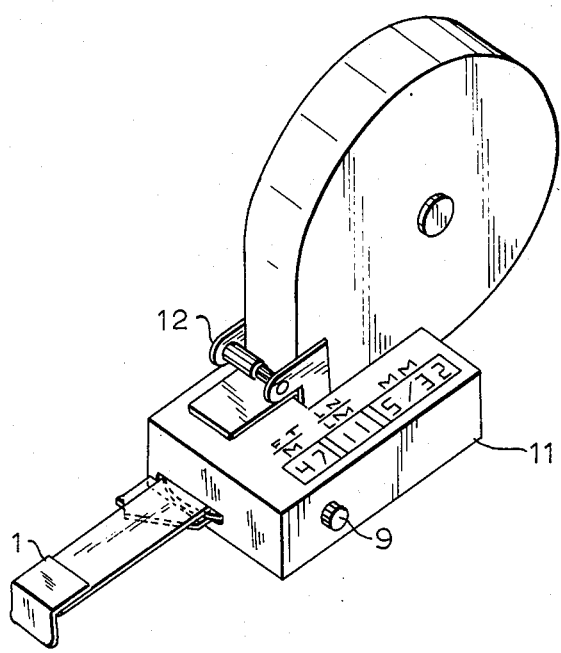
FIG. 1 is a perspective view of a measuring attachement in accordance with the present invention, with a tape cooperating therewith.
Figure 2:
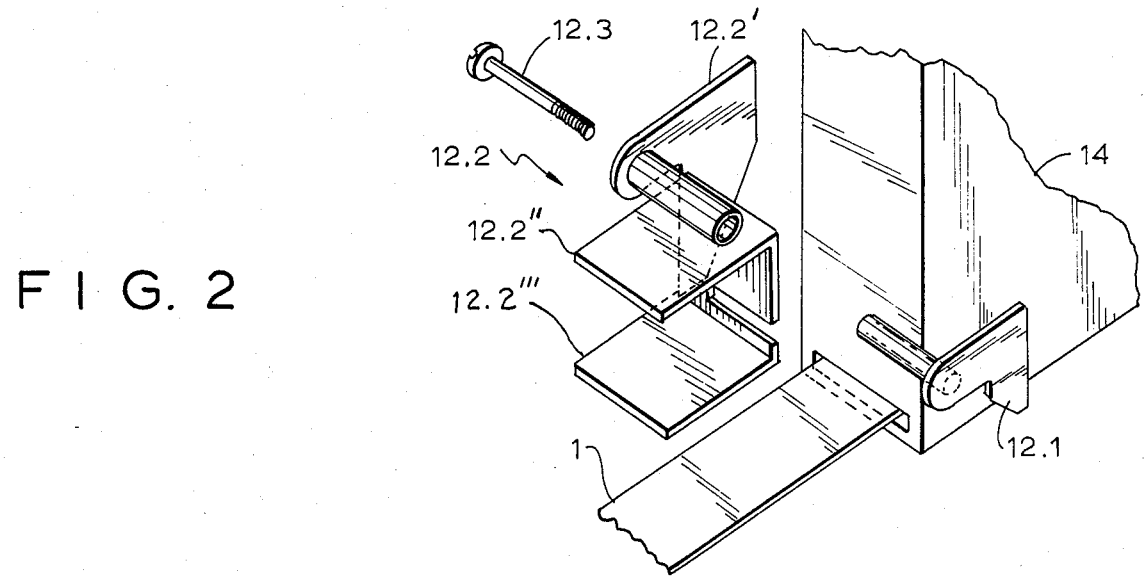
FIG. 2 is a view showing a mounting device for mounting the attachement to a tapeline.
Figure 3:
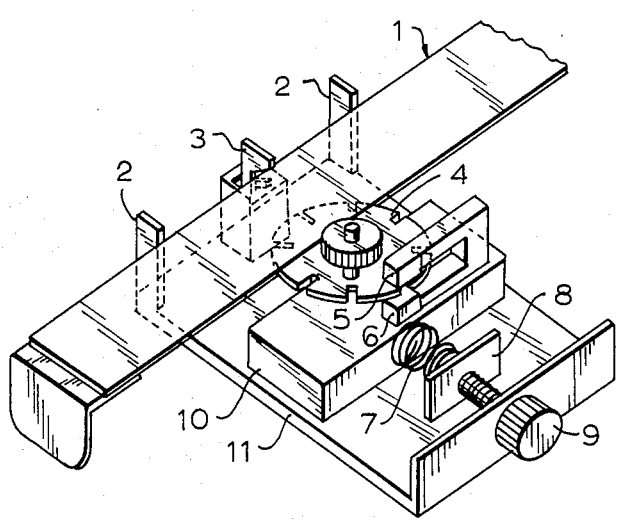
FIG. 3 is a perspective view of one part of the inventive measuring attachement.
Figure 4:
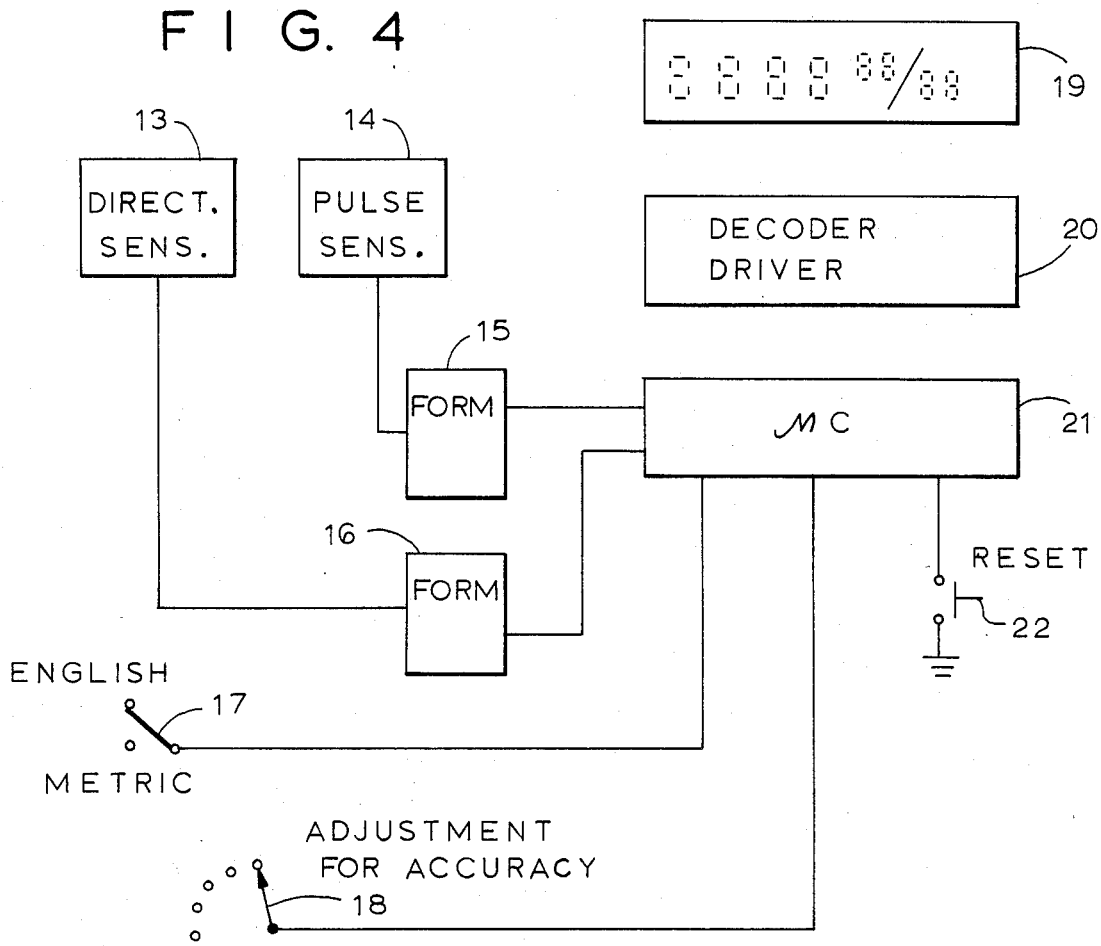
FIG. 4 is a view showing an electrical block-diagram of the inventive attachement.
Figure 5:
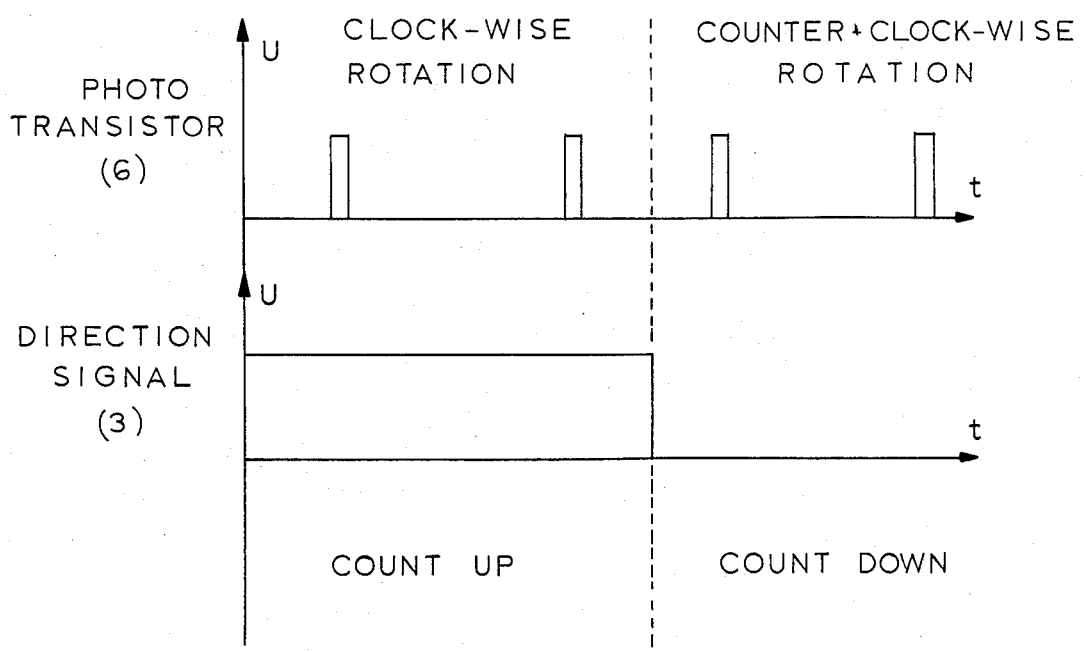
FIG. 5 is a view showing input electrical signals supplied to a computer, in dependence upon the direction of movement of the tape.

As can be seen particularly from FIGS. 1 and 2 a measuring attachement has a housing 11 with a recess for receiving a casing 14 of a tapeline. A mounting device for mounting the housing 11 of the attachement to the casing 14 of the tapeline is identified as 12. The mounting device has two brackets 12.1 and 12.2 provided with short pipes telescopable in one another. The bracket 12.2 has a bracket part 12.2' and a U-shaped part having two plates 12.2" and 12.2''' all of one piece with one another. A slot in the U-shaped part imparts springy action to the latter. A screw 12.3 can extend through two telescopable pipes of the brackets 12.1 and 12.2. For mounting the attachement, the brackets 12.1 and 12.2 clamp the casing 14 therebetween with the aid of the screw 12.3, and then the housing 11 is inserted into a space between the plate 12.2" and 12.2''' and clamped there by the springy action.

The attachement cooperates with a tape 1 of the tapeline. The housing 11 has a slot through which the tape passes into a space between two stops 2 and a disc 4. The latter is mounted on a plate 10 which can be displaced by an adjusting screw 9 via a spring 7 and a plate 8. When the tape is received in this space, the screw is turned to move the plate 10 and to press the disc 4 against the tape 1, until the spring 7 provides a sufficient frictional contact between the upper portion of the disc 4 and the edge of the tape.

The disc 4 is light-permeable and has a plurality of slots. A light-emitting member, for example a light-emitting diode 5 is located at one side of the disc 4, whereas a light-receiving member for example a phototransistor 14 is located at the opposite side of the disc 4. When the tape 1 moves, the disc 4 rotates by means of the frictional contact with the tape, the light from the member 5 passes through the slots in the disc 4 and is received by the member 14 which generates electrical impulses. The latter pass through a forming device 15 which improves the shape of the impulses and are supplied to a microcomputer. A sensor of movement direction 3 simultaneously generates a signal of movement direction "1" or "0" which is supplied through a forming device 16 to a second input of the microcomputer.

Depending on the number of slots and the length of the circumference of the disc 4, each electronic impulse received by the microcomputer corresponds to a certain measured distance on the tape. The attachement also has a switch 17 for changing the systems of measurement, for example between the British system and the metric system. The switch 17 is actuatable by a user and generates a signal which is also supplied to the microcomputer.

When the attachement is to be used for high accuracy measurements, adjustment of accuracy must be provided. For this purpose, a switch of accuracy adjustment can be provided as identified by reference 18. The signal from the switch 18 is supplied to the microcomputer, and the latter can change the length corresponding to one impulse, depending upon the position of the switch 18. With this switch, its position is set for maximum accuracy of measurements during mounting of the attachment on the tapeline.

Figure 6:
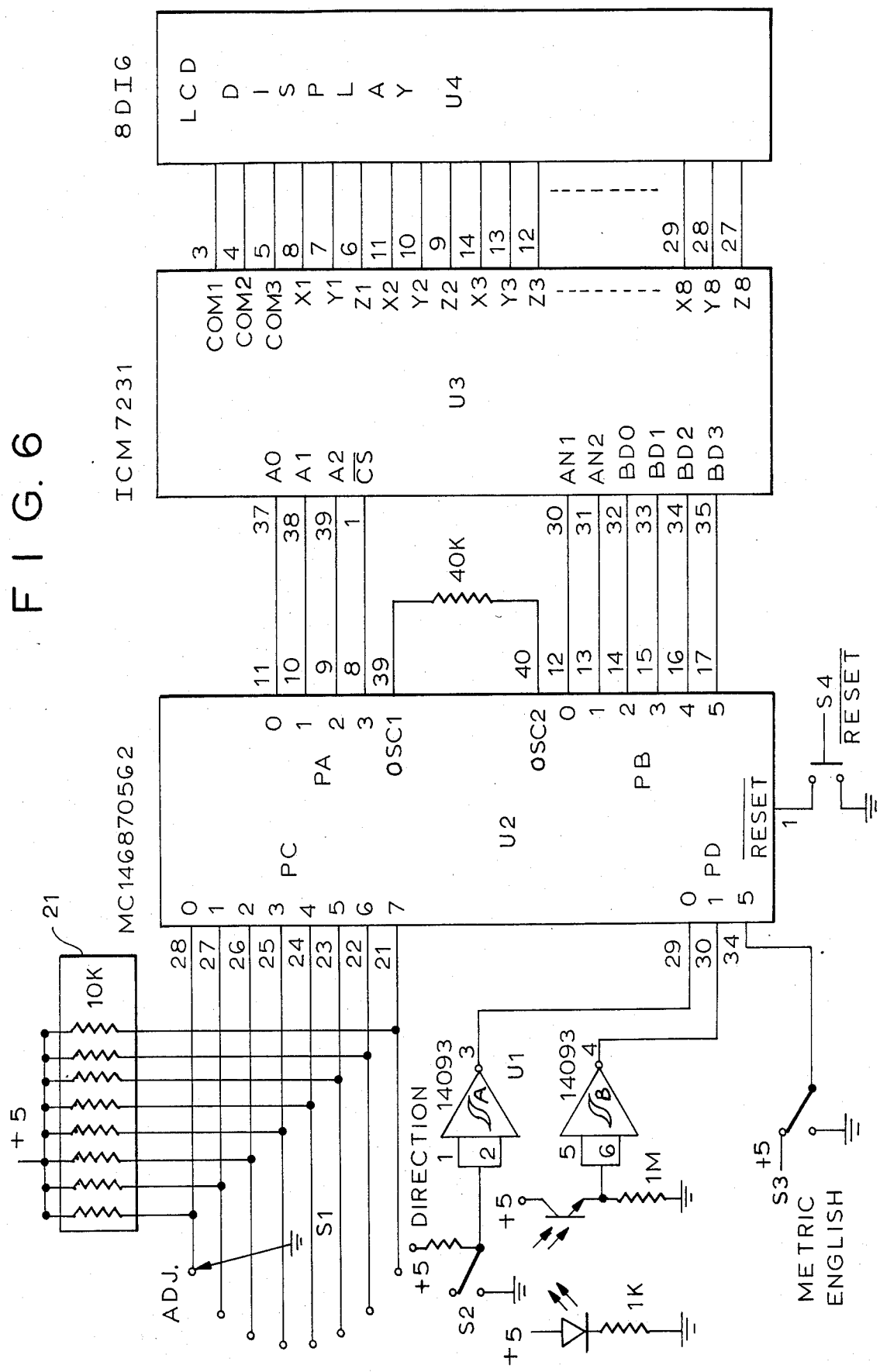
FIG. 6 is a view showing an exemplary electrical diagram of the attachement of the invention.
Figure 7:
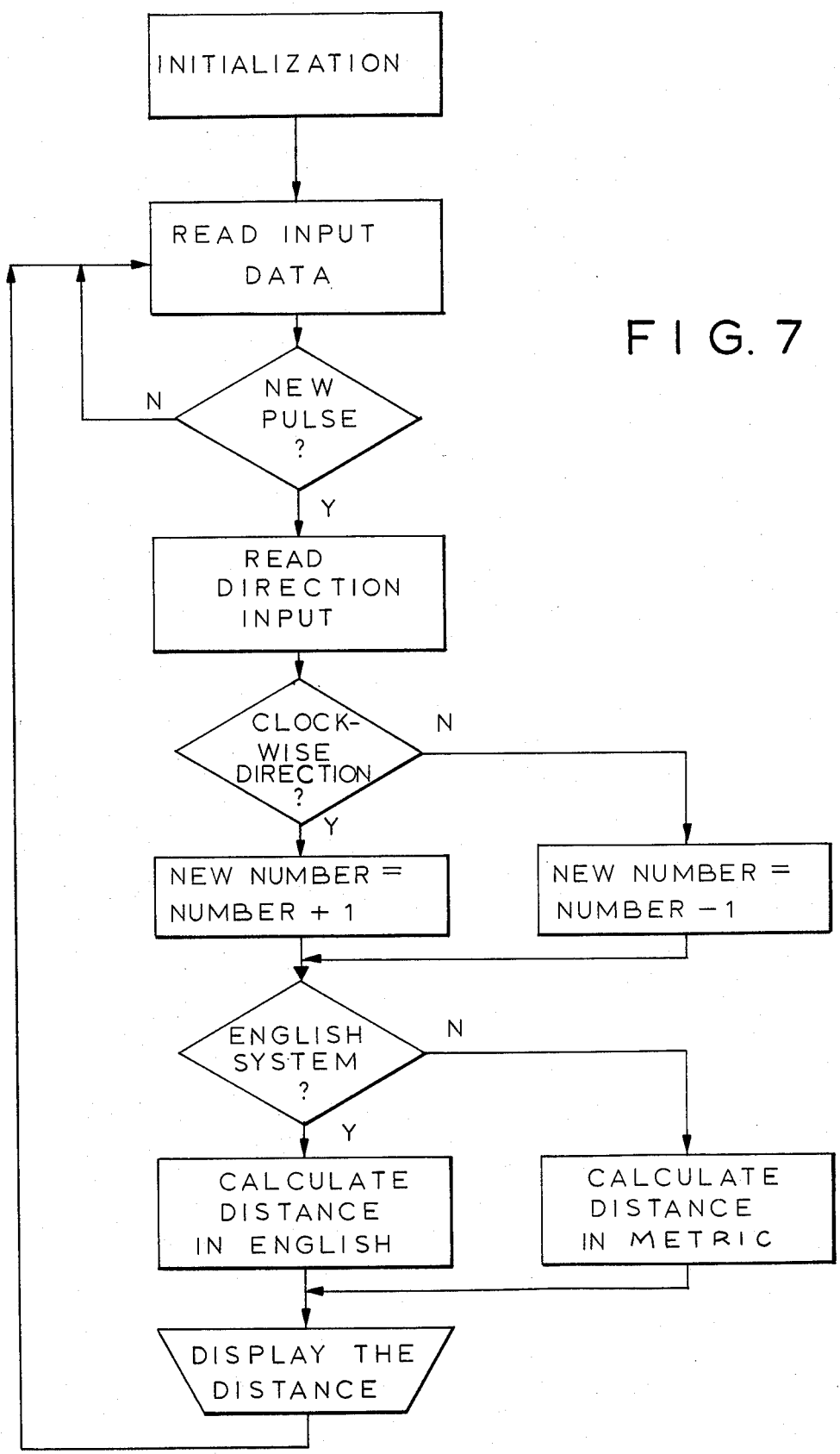
FIG. 7 shows a simplified block diagram of the operation of the computer.

The microcomputer 21 converts the received signals into the length of the object which has been measured, the length expressed in the respective system of measurement. The thus produced data are shown on the electronic display. It is believed that the operation of the microcomputer is clear from the block diagram thereof, shown in FIG. 6.

It should be emphasized that the measuring attachment can operate in accordance with two modes. In one mode the tape is stretched on horizontal or vertical surfaces, the attachement is not connected with the casing of the tapeline and moves along the tape. In the other mode the attachement is mounted on the casing, and the tape is pulled through the attachment.

The invention is not limited to the details shown since various modifications and structural changes are possible without departing in any way from the spirit of the present invention.

What is desired to be protected by Letters Patent is set forth in particular in the appended claims.

We claim:

1. A distance measuring attachement to be associated with an elongated movable element, such as a tape and the like, comprising a housing; receiving means provided on said housing and formed so that an elongated movable element can be received in said receiving means and move in said receiving means; rotary means provided in said housing and bringable into a frictional contact with said element; means for adjusting said rotary means so as to bring said rotary means into frictional contact with said element; means for transforming the rotary movement of said rotary means, caused by the frictional contact with said movable element, into signals; means for receiving said signals and transforming them into distance measuring data; means for displaying said data; and means for mounting said housing to a casing of a tapeline and the like, said mounting means including first clamping means for clamping the casing of a tapeline and the like, and second clamping means connected with said first clamping means and clamping said housing.

2. An attachement as defined in claim 1, wherein at least a part of one of said clamping means is formed of one piece with the other of said clamping means.

3. An attachement as defined in claim 2, wherein said second clamping means includes a U-shaped springy bracket arranged to confine said housing therebetween with a springy action and formed of one piece with one of said brackets.

4. An attachement as defined in claim 3, wherein said U-shaped bracket has a slot imparting the springy action to the same.

5. A distance measuring attachement to be associated with an elongated movable element, such as a tape and the like, comprising a housing; receiving means provided in said housing and formed so that an elongated movable element can be received in said receiving means and move in said receiving means; rotary means provided in said housing and bringable into a frictional contact with said element, said receiving means including a space formed between said rotary means and an additional limiting member; means for adjusting said rotary means so as to bring said rotary means into the frictional contact with said element; means for transforming the rotary movement of said rotary means, caused by the frictional contact with said movable element, into signals; computer means for receiving said signals and transforming them into distance measurement data; and means for displaying said data.

6. An attachement as defined in claim 5, wherein said rotary means includes a rotary member having a plurality of radial slots spaced from one another in a circumferential direction, said transforming means including a light emitting member located at one axial side of said rotary member and a light receiving element arranged at the opposite axial side of said rotary member and receiving the light passing through said slots during rotation of said rotary member in frictional contact with said movable element.

7. An attachement as defined in claim 5, wherein said housing has a plurality of walls, said receiving means having an inlet and an outlet for said movable element and formed as an inlet slot and an outlet slot provided in the respective walls of said housing.

8. An attachement as defined in claim 5; and further comprising means for selecting a system of measurements from at least two systems of measurements and including switching means generating a signal and supplying said signal to said computer means.

9. An attachement as defined in claim 5; and further comprising means for changing accuracy of measurements and including switching means generating a signal and supplying said signal to said computer means.

10. An attachement as defined in claim 5; and further comprising means for sensing directions of movement of said movable element and producing a signal which is supplied to said computer means.

11. An attachement as defined in claim 5, wherein said computer means is formed as a microcomputer.

* * * * *